Sept. 28, 1965 J. W. GRAY 3,209,253
FREQUENCY MEASURING CIRCUIT UTILIZING TRANSISTORS TO
SWITCH CAPACITOR CURRENTS
THROUGH AN INDICATOR
Filed June 26, 1962 2 Sheets-Sheet 1

*INVENTOR.*
JOHN W. GRAY
BY
ATTORNEY

INVENTOR.
JOHN W. GRAY
BY
ATTORNEY

United States Patent Office 3,209,253
Patented Sept. 28, 1965

3,209,253
FREQUENCY MEASURING CIRCUIT UTILIZING TRANSISTORS TO SWITCH CAPACITOR CURRENTS THROUGH AN INDICATOR
John W. Gray, Pleasantville, N.Y., assignor to General Precision, Inc., a corporation of Delaware
Filed June 26, 1962, Ser. No. 205,382
8 Claims. (Cl. 324—78)

This invention relates to electronic circuits for measuring frequency and particularly to frequency-measuring circuits employing a capacitor as the principal measuring element.

The frequency of an alternating potential having a fixed peak-to-peak value can be measured by successively applying it during one half cycle to charge a capacitor, then discharging the capacitor during the next half cycle. The magnitude of the capacitor current is proportional to the frequency and can be used as a measure of the frequency. By the use of a measuring resistor, a potential proportional to the current can be developed and used instead of the current as a measure of the frequency. The potential can also be employed to position a servomechanism so that its shaft angle is a measure of the frequency.

By using a transistor switch to switch the capacitor synchronously with the input frequency, the switching operation is made highly accurate, and its accuracy is but little affected by temperature changes within the usual ambient range of $-55°$ C. to $+110°$ C.

An object of this invention is to provide a circuit for accurately measuring frequency.

Another object of this invention is to provide a transistorized frequency measuring circuit utilizing a capacitor as the principal measuring element.

Still another object of this invention is to provide a circuit to which an alternating signal is applied, the circuit emitting an output signal having a magnitude representing the input frequency.

A further understanding of this invention may be secured from the detailed description and drawings, in which.

Figure 1:
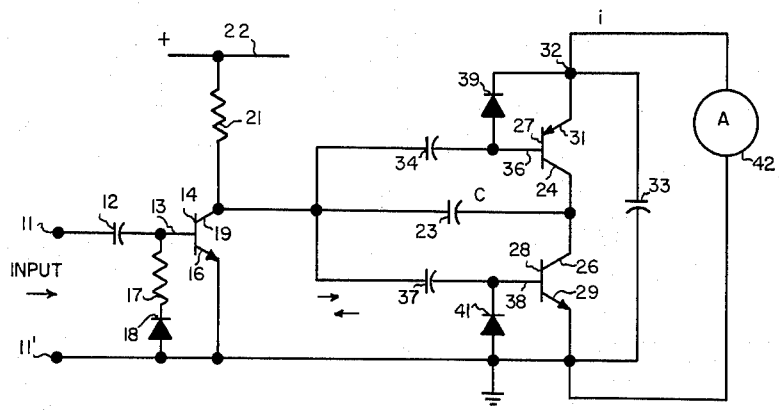
FIGURE 1 is a schematic drawing of an embodiment of the invention having a current output.

Referring now to FIGURE 1, an input signal having an alternating component is applied between terminal 11 and a ground terminal 11'. This input signal is applied through a capacitor 12 to the base 13 of a transistor 14 which has a ground emitter 16. Thus an alternating signal is applied across the base-emitter diode element of the transistor 14. A resistor 17 and diode 18 are connected between the base 13 and ground. The collector 19 of transistor 14 is connected through a resistor 21 to a positive source represented by bus 22. The collector 19 is also connected through a measuring capacitor 23, having a capacitance C, to the collectors 24 and 26 of PNP transistor 27 and NPN transistor 28. The emitter 29 of transistor 28 is grounded and the emitter 31 of transistor 27 is connected to a junction 32. A large capacitor 33 is connected between junction 32 and ground.

The collector 19 of transistor 14 is also connected through a capacitor 34 to the base 36 of transistor 27 and is connected through a capacitor 37 to the base 38 of transistor 28. The base 36 is connected to the anode of a diode 39 having its cathode connected to junction 32. The base 38 is connected to the cathode of a diode 41 having its anode grounded. The junction 32 is grounded through an ammeter 42. The ammeter resistance is low. It it were zero, with zero inductance, the capacitor 33 could be omitted.

In the operation of the several circuits of this invention, the input signal has an alternating component, the frequency of which, $f$, is to be measured. The only requirement for this input signal is that its alternating component must be large enough to make the transistor 14 completely conductive at one peak and to make the transistor completely nonconductive at the other peak. The output potential at collector 19 will, then, have a definite low value, slightly above ground potential, at one peak, and will have the value of the positive bus at the other peak. Since it will be shown that the input frequency, $f$, has the value given by the equation $$f = \frac{i}{CV} \qquad (1)$$

in which $i$ is the ammeter current and V is the peak-to-peak value of the potential of collector 19, it is necessary that this peak-to-peak potential, V, be quite definite. This is effected by the limiting action of the transistor 14, which produces a trapezoidal waveform at its output as shown, idealized, in FIGURE 2, with a definite peak-to-peak potential V.

Figure 2:
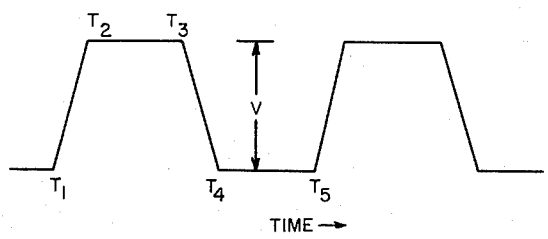
FIGURE 2 is a graph illustrating the operation of the invention.

In the operation of the circuit of FIGURE 1, when the collector 19 is rising to its positive peak, as between times $t_1$ and $t_2$, FIGURE 2, the positive-going potential is coupled by capacitor 37 to the base 38 of transistor 28, causing positive current to flow into this base and making transistor 28 fully conductive. At the same time the positive-going potential is applied to the capacitor 23 applying a charge during the time $t_1$, $t_2$ of $$Q = CV \qquad (2)$$

to the input or left side of the capacitor. Since the right side of the capacitor is grounded through the transistor 28, at the end of the potential rise the left side has been changed inpotential by the amount V and the right side is at a definite potential above ground equal to the drop through the base-emitter diode of transistor 28 and termed ground potential for the purpose of this description. At the same time the positive-going potential is coupled through the capacitor 34 to the diode 39, making it conductive and connecting the output or right side of capacitor 34 through junction 32 to the capacitor 33. Since the capacitor 33 is much larger than capacitor 34, the output side of capacitor 34 is held substantially at ground potential while the left side is charged to V.

During the time $t_2$ to $t_3$ the charge applied to the input side of capacitor 37 remains constant, so that the current flow to the base 38 ceases and becomes zero. This causes the transistor 28 to cease conducting at some time prior to the time $t_3$. The time constant of the capacitor 23 discharge circuit is made sufficiently short so that this capacitor is completely discharged to ground before the transistor 28 ceases to conduct.

When the potential of collector 19 at time $t_3$ starts to decrease, at some time subsequent to time $t_3$ the downgoing potential which is coupled through capacitor 34 closes the same time the downgoing potential is coupled by diode 39 and also makes transistor 27 conductive. At capacitor 23 to the collector 24 of transistor 27, causing a positive current flow from ground through the ammeter 42, junction 32 and transistor 27 to the right side of capacitor 23. In this description it is assumed that the resistance of ammeter 42 is low, so that the potential of junction 32 is substantially that of ground. At time $t_4$ the potentials of both sides of capacitor 23 are substantially at ground potential and the quantity of electricity which has flowed into the right side of capacitor 23 is equal to that which has flowed out, and is numerically equal to CV. Meanwhile, the change which was secured by capacitor 33 flows out of it to capacitor 34, equalling the charge which previously moved in the other direction so that this movement of charge does not affect the accuracy of the circuit. At the same time the downgoing potential is coupled through capacitor 37, making diode 41 conductive and preventing the right side of capacitor 37 from assuming any potential substantially below ground potential.

Between times $t_4$ and $t_5$, since the potential of collector 19 is no longer changing, current flow in the base 36 ceases and transistor 27 becomes nonconductive.

To recapitulate, the transistors 27 and 28 are alternately conductive, causing a charge to flow from the right side of capacitor 23 to ground during one half cycle and an equal charge to flow into the capacitor through ammeter 42 during the other half cycle. Thus the two transistors 27 and 28 together function like a single-pole double-throw switch. This behavior as a switch depends solely on the current flowing in the base-emitter diode within the transistor, and does not depend at all on the amount or sense of potential applied to the collector. The behavior as a switch is highly accurate providing, as described, that during the conductive period of a transistor the right side of capacitor 23 is substantially completely charged or discharged and that the conducting transistor then becomes nonconducting before the end of the flat peak of the signal applied to the left side of capacitor 23.

Capacitor current is defined as the amount of charge flowing in or out per unit time. Therefore the positive current, $i$, flowing through ammeter 42 into capacitor 23 is $Qf$, or $$i = Qf \quad (3)$$

Combining Equations 2 and 3

$$i = CVf \quad (4)$$

or $$f = \frac{i}{CV} \quad (1)$$

Thus the current indicated by the ammeter 42 is linearly proportional to the frequency of the alternating component of the input signal.

FIGURE 1 is explanatory of the operation of the invention but its accuracy leaves something to be desired because any indicating ammeter has an accuracy far inferior to the accuracy of which the remainder of this circuit is capable.

Figure 3:
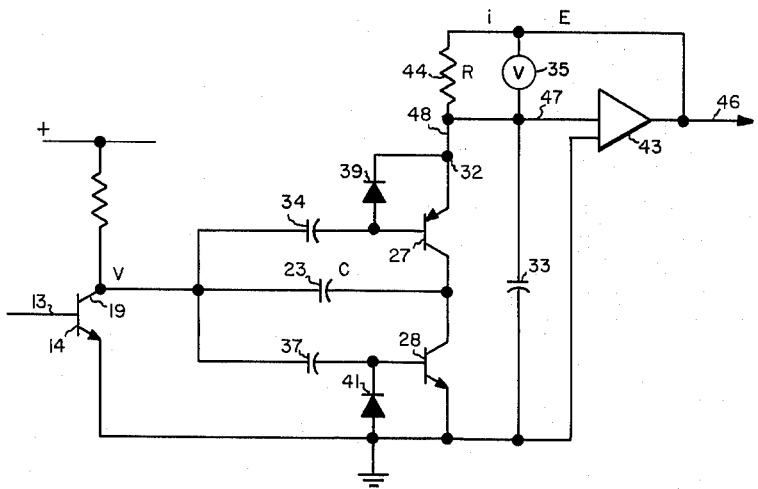
FIGURE 3 is a schematic drawing of an embodiment of invention having a potential output.

The circuit of FIGURE 3 is more accurate than that of FIGURE 1 because the current is converted by a resistor into a voltage output, and because a high-gain servoamplifier and a negative feedback circuit are provided to avoid appreciable loading of the transistor output terminal 32, FIGURE 1.

In FIGURE 3 an alternating input signal is applied to the base 13 of a limiting transistor 14. The output from collector 19, as before, is applied to a measuring capacitor 23 and to two switching capacitors 34 and 37. The circuit of transistors 27 and 28 and of diodes 39 and 41 is the same as described in connection with FIGURE 1. The junction 32 is connected, as before, to a large capacitor 33. The junction 32 is also connected to a high-gain, high input impedance inverting amplifier 43. A resistor 44, having resistance R, is connected between the amplifier input and output. The output signal consists of the potential of the amplifier output conductor 46, which may be measured by a voltmeter 35 connected across the resistor 44.

In the operation of the circuit of FIGURE 3, because of amplifier characteristics it may be considered that the amplifier input, 47, is at zero potential relative to ground and that the amplifier input current is zero. The current, $i$, in the conductor 48 must therefore all flow through the resistor 44. The capacitor 33 current must be disregarded since its current during one-half cycle in conductor 48 is exactly equal and opposite to the current in the other half cycle. The current, $i$, therefore equals E, the amplifier output potential, divided by R, or $$i = \frac{E}{R} \quad (5)$$

Combining (1) and (5)

$$f = \frac{E}{RCV} \quad (6)$$

Since V effects E as much as $f$ does, it is necessary to hold V constant. On the other hand, V may be employed as an additional variable. If, however, the source potential from which V is derived is also employed for the utilization apparatus to which conductor 46 is connected, and the utilization apparatus is so arranged as to be affected by source changes as V is, then variations in the source are cancelled.

Figure 4:
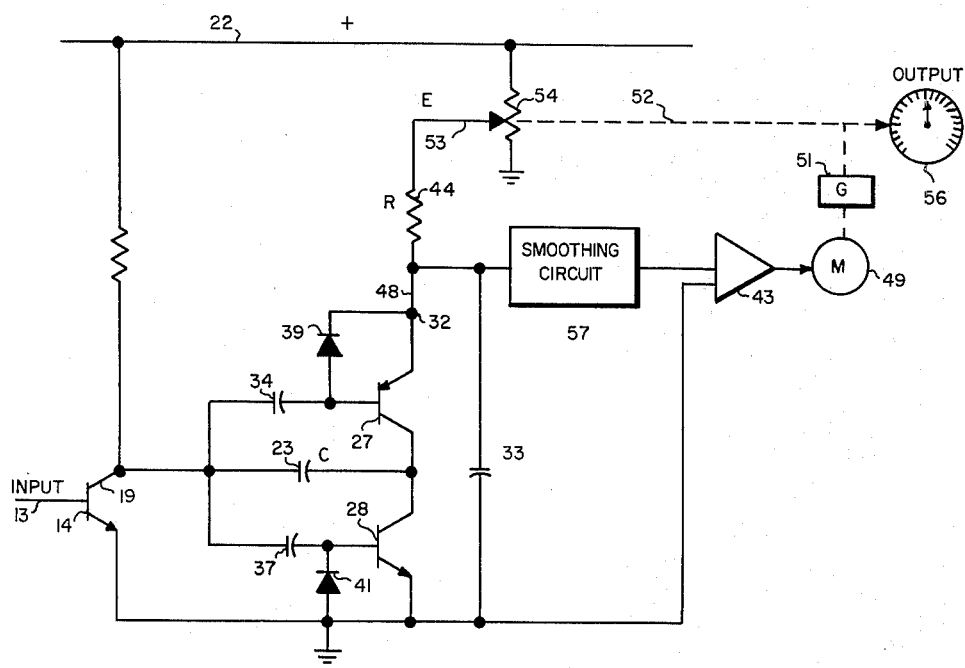
FIGURE 4 is a schematic drawing of an embodiment of the invention having a shaft angle output.

One way of indicating the signal output with an accuracy commensurate with the inherent accuracy of the circuit is shown in FIGURE 4. The input circuit and transistor switch are the same as indicated in FIGURES 1 and 3. The junction 32 is connected, as in FIGURE 3, to a capacitor 33, an amplifier 43 and a resistor 44. In this case the amplifier should have a high input impedance and have high gain, but may be either inverting or noninverting. The amplifier output is connected to operate a motor 49 which, through a speed step-down gear train 51, operates a shaft 52. This shaft is connected to move the slider 53 of a potentiometer 54 connected between the positive bus 22 and ground. The slider 53 is connected to one end of the resistor 44.

In operation, the current, $i$, flowing from the slider 53 through conductor 48 into the capacitor 23 has a value given by Equation 4, and the corresponding potential, E, of the slider 53 is that given by Equation 5. If, now, the slider is positioned nearer the bus 22, increasing the slider potential, additional current flows and tends to flow into the amplifier 43, causing the motor 49 to rotate in such sense as to reduce the potential of the slider. If, on the other hand, the slider potential is lower than it should be, the amplifier 43 output current is reversed, causing the motor 49 to run in the opposite direction and to increase the slider potential. Thus the slider potential E is brought by the servomechanism to the value given by Equation 6.

The circuit of FIGURE 4 employs a linear potentiometer 54. However, when a linear potentiometer is loaded by extracting a current from its slider, its slider potential is no longer strictly proportional to its slider position. This nonlinearity may, however, be easily corrected by well-known means so that, when the potentiometer is under a load as in the embodiment of FIGURE 4, the slider potential is a linear function of the slider displacement. If, then, the angular displacement, $x$, of the output shaft 52 bears the linear relation to E of $$E = Vx \quad (7)$$

the relation of shaft displacement to frequency is linear and is given by $$f = \frac{x}{RC} \quad (8)$$

and a linear frequency scale 56 may be applied to the shaft.

The excitation of amplifier 43 and the resulting operation of motor 49 occurs, due to the current flow of capacitor 23, only when the transistor 27 is conductive and is absent when the transistor 27 is nonconductive. This would produce a motor input pulsating at the rate of $f$. However, due to the charge from capacitor 34 stored in capacitor 33 during one half cycle and released in the next half cycle, these pulsations are somewhat smoothed. Additionally, if desired, a smoothing circuit 57 may be inserted in the amplifier input to reduce the ripple further.

Figure 5:
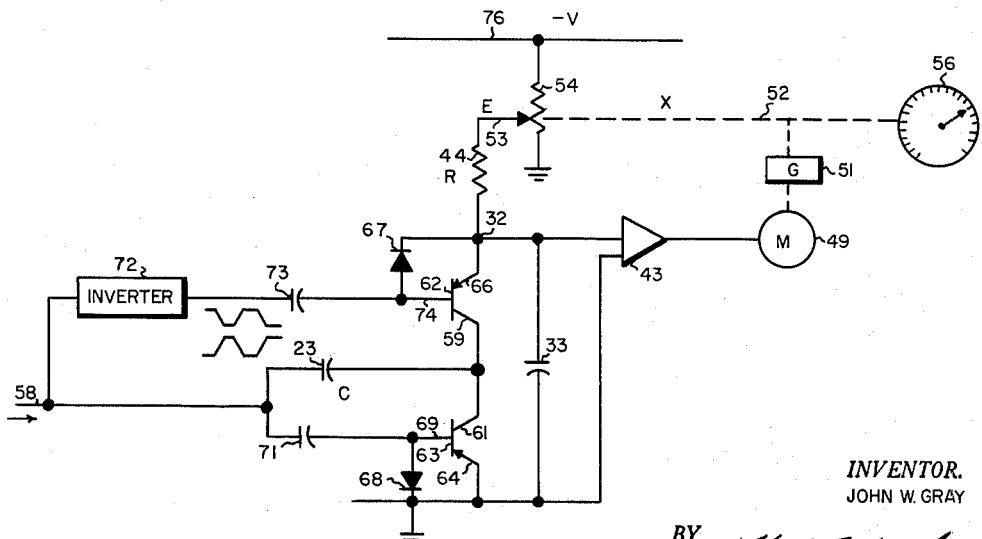
FIGURE 5 is a schematic drawing of an embodiment of the invention employing two transistors of the same kind.

The circuit of FIGURE 5 has the advantages that it employs two transistors of the same kind and that the output current variation to the motor is inherently much smoother than in the circuit of FIGURE 4. This results in a more easily stabilized servo loop and permits the use of less filtering in the motor input.

In FIGURE 5, a trapezoidal alternating signal having a selected and constant peak-to-peak potential V is applied through conductor 58 to the left side of measuring capacitor 23. The right side is connected to the collectors 59 and 61 of two PNP transistors 62 and 63. The emitter 64 is grounded and emitter 66 is connected to a junction 32. The base-to-emitter diodes of transistors 62 and 63 are bridged by diodes 67 and 68 poled oppositely to the transistor diodes. The base 69 of transistor 63 is coupled through a capacitor 71 to the input conductor 58. The input conductor 58 is also connected to the input of an inverter 72, the phase-inverted output of which is coupled by a capacitor 73 to the base 74 of transistor 62. A capacitor 33 connects junction 32 to ground. The junction 32 is also connected to the input of an amplifier 43 and to one end of a resistor 44 having resistance R. The other end of resistor 44 is connected to the slider 53 of a potentiometer 54 having one end grounded and the other end connected to a negative bus 76. The amplifier 43 operates a motor 49 which, through step-down gears 51, operates a shaft 52 connected to a slider 53 and to a dial 56 calibrated in frequency terms.

In operation, during the upgoing part of the input signal, transistor 63 is nonconductive and transistor 62 conductive. Diode 68 is conductive and diode 67 is nonconductive. Positive current flows from capacitor 23 through transistor 62 to the junction 32, operating the motor. During the other half cycle positive current through diode 67 also tends to operate the motor. As a result, the pulsations applied to amplifier 43 are only one-third as severe as in the circuit of FIGURE 4 and also are at double the frequency of the FIGURE 4 pulsations. The relation of the input signal frequency to the angular deflection of shaft 52 is given by Equation 8.

What is claimed is:
1. A frequency measuring circuit comprising,
a capacitor having an alternating current impressed on a first terminal thereof,
switch means including a pair of transistors each including base, emitter and collector electrodes having theid like electrodes of their emitter-collector circuits connected together with the common junction thereof connected to a second terminal of said capacitor,
capacitive means coupling said alternating current to the bases of said pair of transistors,
a diode connected between the base and emitter of each of said transistors,
and a measuring circuit interconnecting the noncommon electrodes of said emitter-collector transistor circuits, whereby the current flowing therein is linearly proportional to the frequency of said impressed alternating current.

2. A frequency measuring circuit comprising,
a capacitor having an alternating current impressed on a first terminal therof,
switch means including a pair of transistors each including base, emitter and collector electrodes having their collectors connected together and to a second terminal of said capacitor,
capacitive means coupling said alternating current to the bases of said pair of transistors,
a diode connected between the base and emitter of each of said transistors,
and a measuring circuit interconnecting the emitter of said transistors whereby the current flowing therein is linearly proportional to the frequency of said impressed alternating current.

3. A frequency measuring circuit comprising,
a capacitor having an alternating current impressed on a first terminal thereof,
switch means including a pair of transistors each including base emitter and collector electrodes having their like electrodes of their emitter-collector circuits connected together with the common junction thereof connected to a second terminal of said capacitor,
capacitive means coupling said alternating current to the bases of said transistors,
a diode connected between the base and emitter of each of said transistors,
and current-indicating means interconnecting the non-common electrodes of said emitter-collector transistor circuits whereby the indicated current is linearly proportional to the frequency of the impressed alternating current.

4. A frequency measuring circuit comprising,
a capacitor having an alternating current impressed on a first terminal thereof,
switch means including a pair of transistors each including base, emitter and collector electrodes having their collectors connected together and to a second terminal of said capacitor,
capacitive means coupling said alternating current to the bases of said pair of transistors,
a diode connected between the base and emitter of each of said transistors,
and current-indicating means interconnecting the emitters of said circuits whereby the indicated current is linearly proportional to the frequency of the impressed alternating current.

5. A frequency measuring circuit comprising,
a capacitor having an alternating current impressed on a first terminal thereof,
an inverting amplifier,
a first transistor including base, emitter and collector electrodes having its emitter-collector path connected between a second terminal of said capacitor and an ungrounded input of said amplifier,
a second transistor including base, emitter and collector electrodes having its emitter-collector path connected between said second terminal of said capacitor and a grounded input of said amplifier,
a diode connected between the base and emitter, of each of said transistors,
capacitive means for impressing said alternating current on the bases of each of said transistors,
a capacitor connected between the grounded and ungrounded inputs of said amplifier,
a resistor connected between the ungrounded input and the output of said amplifier, and
means for determining the potential existing across said resistor.

6. A frequency measuring circuit comprising,
a capacitor having an alternating current impressed on a first terminal thereof,
an amplifier,
a first transistor including base, emitter and collector electrodes having its emitter-collector path connected between a second terminal of said capacitor and an ungrounded input of said amplifier,
a second transistor including base, emitter and collector electrodes having its emitter-collector path connected between said second terminal of said capacitor and a grounded input of said amplifier,
a diode connected between the base and emitter of each of said transistors,
capacitive means for impressing said alternating current on the bases of each of said transistors,
a capacitor connected between the grounded and ungrounded inputs of said amplifier,
a motor operated by the output signal of said amplifier, a potentiometer connected between a source of potential and ground having the slider thereof positioned by said motor, and a resistor connected between the slider of said potentiometer and the ungrounded input of said amplifier.

7. A frequency measuring circuit comprising, a capacitor having an alternating current impressed on a first terminal thereof, an amplifier, a PNP transistor including base, emitter and collector electrodes having its collector connected to a second terminal of said capacitor and its emitter connected to an ungrounded input of said amplifier, a NPN transistor including base, emitter and collector electrodes having its collector connected to said second terminal of said capacitor and its emitter connected to a grounded input of said amplifier, a first diode connected between the base and emitter of said PNP transistor, poled to be conductive in the direction of the emitter thereof, a second diode connected between the base and emitter of said NPN transistor poled to be conductive in the direction of the base thereof, capacitive means for impressing said alternating current on the bases of each of said transistors, a capacitor connected between the grounded and ungrounded inputs of said amplifier, a motor operated by the output signal of said amplifier, a potentiometer connected between a source of potential and ground having the slider thereof positioned by said motor, and a resistor connected between the slider of said potentiometer and the ungrounded input of said amplifier.

8. A frequency measuring circuit comprising, a capacitor having an alternating current impressed on a first terminal thereof, an amplifier, a first PNP transistor including base, emitter and collector electrodes having its collector connected to a second terminal of said capacitor and its emitter connected to an ungrounded input of said amplifier, a second PNP transistor including base, emitter, and collector electrodes having its collector connected to said second terminal of said capacitor and its emitter connected to a grounded input of said amplifier, a diode connected between the base and emitter of each of said transistors, each of said diodes being poled to be conductive in the direction of the emitter of a respective transistor, capacitive means for impressing said alternating current on the base of said second transistor, a phase inverter having said alternating current impressed on its input, capacitive means connecting the output of said phase inverter to the base of said first transistor, a capacitor connected between the grounded and ungrounded inputs of said amplifier, a motor operated by the output signal of said amplifier, a potentiometer connected between a source of potential and ground having the slider thereof positioned by said motor, and a resistor connected between the slider of said potentiometer and the ungrounded input of said amplifier.

References Cited by the Examiner

UNITED STATES PATENTS

| | | | |
|---|---|---|---|
| 2,957,135 | 10/60 | Gray | 324—78 |
| 3,099,799 | 7/63 | Bahro | 324—78 X |

FOREIGN PATENTS 216,630   8/61   Austria.

WALTER L. CARLSON, *Primary Examiner.*